United States Patent
Youn et al.

(10) Patent No.: US 10,515,225 B2
(45) Date of Patent: Dec. 24, 2019

(54) METHOD FOR MUTUAL VERIFYING OF DATA OWNERSHIP

(71) Applicant: ELECTRONICS AND TELECOMMUNICATIONS RESEARCH INSTITUTE, Daejeon (KR)

(72) Inventors: Taek-Young Youn, Daejeon (KR); Keonwoo Kim, Daejeon (KR); Ku Young Chang, Daejeon (KR); Nam-Su Jho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 481 days.

(21) Appl. No.: 15/179,375

(22) Filed: Jun. 10, 2016

(65) Prior Publication Data

US 2017/0193245 A1   Jul. 6, 2017

(30) Foreign Application Priority Data

Jan. 4, 2016   (KR) .................. 10-2016-0000615

(51) Int. Cl.
| | |
|---|---|
| *G06F 21/62* | (2013.01) |
| *H04L 29/06* | (2006.01) |
| *G06F 16/13* | (2019.01) |
| *G06F 16/174* | (2019.01) |
| *G06F 16/22* | (2019.01) |
| *G06F 16/23* | (2019.01) |

(52) U.S. Cl.
CPC .......... *G06F 21/6218* (2013.01); *G06F 16/13* (2019.01); *G06F 16/1748* (2019.01); *G06F 16/2228* (2019.01); *G06F 16/2365* (2019.01); *H04L 67/42* (2013.01)

(58) Field of Classification Search
CPC .......... G06F 21/6218; G06F 17/30091; G06F 17/30156; G06F 17/30321; G06F 16/2228; G06F 16/2365; G06F 16/13; G06F 16/1748; H04L 67/42; H04L 67/20
USPC ......................................................... 726/28
See application file for complete search history.

(56) References Cited

U.S. PATENT DOCUMENTS

| | | | |
|---|---|---|---|
| 8,103,636 B2 | 1/2012 | Lee et al. | |
| 8,245,040 B2* | 8/2012 | Matsuo | H04L 9/3236 |
| | | | 713/155 |
| 8,392,708 B2* | 3/2013 | Shah | G06F 21/64 |
| | | | 713/168 |
| 8,528,085 B1 | 9/2013 | Juels | |

(Continued)

FOREIGN PATENT DOCUMENTS

CN   103731261 A *  1/2014  ............... H04L 9/63

OTHER PUBLICATIONS

S. Halevi, et al., "Proofs of Ownership in Remote Storage Systems", *Proceedings of the 18th ACM Conference on Computer and Communications Security*, Chicago, Illinois, USA, Oct. 17-21, 2011, pp. 491-500.

(Continued)

*Primary Examiner* — Saleh Najjar
*Assistant Examiner* — Feliciano S Mejia
(74) *Attorney, Agent, or Firm* — NSIP Law

(57) ABSTRACT

The present invention relates to a method and device for verifying data ownership. The user may verify whether the server actually owns the data to be uploaded by him, and the server may simultaneously verify whether the user actually owns the data.

19 Claims, 3 Drawing Sheets

(56) References Cited

U.S. PATENT DOCUMENTS

| | | |
|---|---|---|
| 8,873,749 B2 | 10/2014 | Jho et al. |
| 9,176,856 B2 * | 11/2015 | Tune ................... G06F 12/0223 |
| 2009/0276622 A1 * | 11/2009 | Matsuo ................... G06F 21/31 |
| | | 713/155 |
| 2013/0007464 A1 * | 1/2013 | Madden .............. G06F 21/6218 |
| | | 713/179 |
| 2015/0288703 A1 * | 10/2015 | Yoshino ................ H04L 9/3242 |
| | | 726/4 |

OTHER PUBLICATIONS

M. I. Husain, et al., "Bidirectional data verification for cloud storage," *Journal of Network and Computer Applications*, vol. 45, Oct. 2014, pp. 1-12.

* cited by examiner

METHOD FOR MUTUAL VERIFYING OF DATA OWNERSHIP

CROSS-REFERENCE TO RELATED APPLICATION

This application claims priority to and the benefit of Korean Patent Application No. 10-2016-0000615 filed in the Korean Intellectual Property Office on Jan. 4, 2016, the entire contents of which are incorporated herein by reference.

BACKGROUND OF THE INVENTION (a) Field of the Invention

The present invention relates to a method for mutual verifying of data ownership. More particularly, the present invention relates to a method for mutually verifying data ownership between a user terminal and a service provider server.

(b) Description of the Related Art

A technique for managing duplicated data among the data stored in a storage server managed by a storage service provider is classified into a server-side deduplication skill and a client-side deduplication skill.

In the server-side deduplication skill, while a data server has received client information, whether entire data stored during a specific time are duplicated is checked, and when duplicated data are found, one corresponding data is stored and the others are removed.

In the client-side deduplication skill, a server is allowed to check whether same data are stored when a user attempts to upload data, and when identical data are found, whether he actually has corresponding data is checked and an access right to the corresponding data is imparted to him.

Efficiency of a storage space follows a deduplication rate, so performances on respective data storage spaces of the server-side and client-side deduplication skills are equal. However, the server-side deduplication skill requires users to upload their data to the server. The client-side deduplication skill does not require him to upload his data when the same data are stored in the storage space of the server so it may substantially reduce a network load.

The client-side deduplication skill needs to accurately determine whether he actually has the data to upload since he can easily receive an access right to data when he can prove ownership of data he does not have.

A skill for verifying data ownership is used for the data deduplication skill, and differing from general encryption skills, it does not manage encrypted secret information but proves that he fully owns the corresponding data based on the owned data. That is, the skill is not based upon secret information such as an encryption key, but it generates proof that may not be generated when he does not actually own the data and proves that he owns the corresponding data based on the generated proof.

A theoretically verified skill to prove the data ownership was initially proposed by Shai Halevi, et. al, in 2011. The proposed method includes allowing a server to store a root value of a Merkle tree on original data, and, when a user attempts to prove his ownership on the corresponding data, allowing the server to select a position of a lowest node from the Merkle tree as a challenge.

The user generates hash values required by a path for calculating to the root from the node selected as a challenge, and transmits the same to the server. That is, the skill proves the ownership of the entire data with information that corresponds to a log length of the entire data by providing him with path information for generating the root value from the hash value on the random lowest node selected by him. The skills for proving the ownership under development are developed to improve the efficiency for generating ownership proving information based on the Shai Halevi scheme, or strengthen stability.

The above-noted client-side deduplication skill is based on the assumption that the data stored in the server are sufficiently well managed. That is, the user deletes his data after his ownership is proved.

Resultantly, when the data stored in the server generates a problem while he acquires the access right to the corresponding data instead of uploading the data, it is substantially impossible to restore the deleted data.

Hence, it is needed to verify whether the user as well as the server actually owns the data in the condition that a right is imparted to the data that are not uploaded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and device for verifying ownership of data for allowing a user to verify whether a server owns data to be uploaded by him and allowing the server to verify whether he owns data.

An exemplary embodiment of the present invention provides a method for a user terminal to verify a data ownership of a service provider server, comprising: selecting a first random number when requesting the service provider server to upload a file, and calculating an index value of the file; calculating a challenge value by using the first random number and a second random number provided by the service provider server; calculating a user response value based on the challenge value by using file information of the file; and verifying ownership on the file stored in the service provider server using a commitment value provided by the service provider server.

The commitment value corresponds to a server response value in response to the challenge value by using file information of a file stored in the service provider server corresponding to the index value. The commitment value is calculated by using a third random number released by the service provider server when the user response value corresponds to the server response value and the server response value.

The calculating a challenge value includes: transmitting the first random number to the service provider server; and receiving the second random number selected by the service provider server when the service provider server has the file corresponding to the index value.

Another embodiment of the present invention provides a method for a service provider server to verify data ownership of a user terminal, comprising: receiving a first random number and an index value of a file from the user terminal; selecting a second random number when a file corresponding to the index value exists, and calculating a challenge value by using the first random number and the second random number; calculating a server response value based on the challenge value by using file information of the file; and receiving a user response value based on the challenge value from the user terminal, and verifying ownership on the file stored in the user terminal according to the server response value and the user response value.

The verifying of ownership includes: calculating a commitment value corresponding to the server response value by using a third random number; determining whether the server response value corresponds to the user response value; and providing an access right to the file to the user terminal when the server response value corresponds to the user response value.

The method further comprises releasing the second random number and the commitment value to the user terminal; releasing the third random number to the user terminal when the server response value corresponds to the user response value; and verifying ownership on the file stored in the service provider server using the third random number and the commitment value by the user terminal. The method further comprises releasing the second random number to the user terminal; and calculating the user response value using file information of the file stored in the user terminal and the challenge value According to the exemplary embodiment of the present invention, the user may verify whether the server actually owns the data he attempts to upload so that he may not delete the data he has to prevent the loss of data when the data stored in the server generate a problem.

Further, the server may verify whether the user actually owns the data so that the server may prohibit the user who does not own data and has no usage right from accessing the corresponding data.

DETAILED DESCRIPTION OF THE EMBODIMENTS

Figure 1:
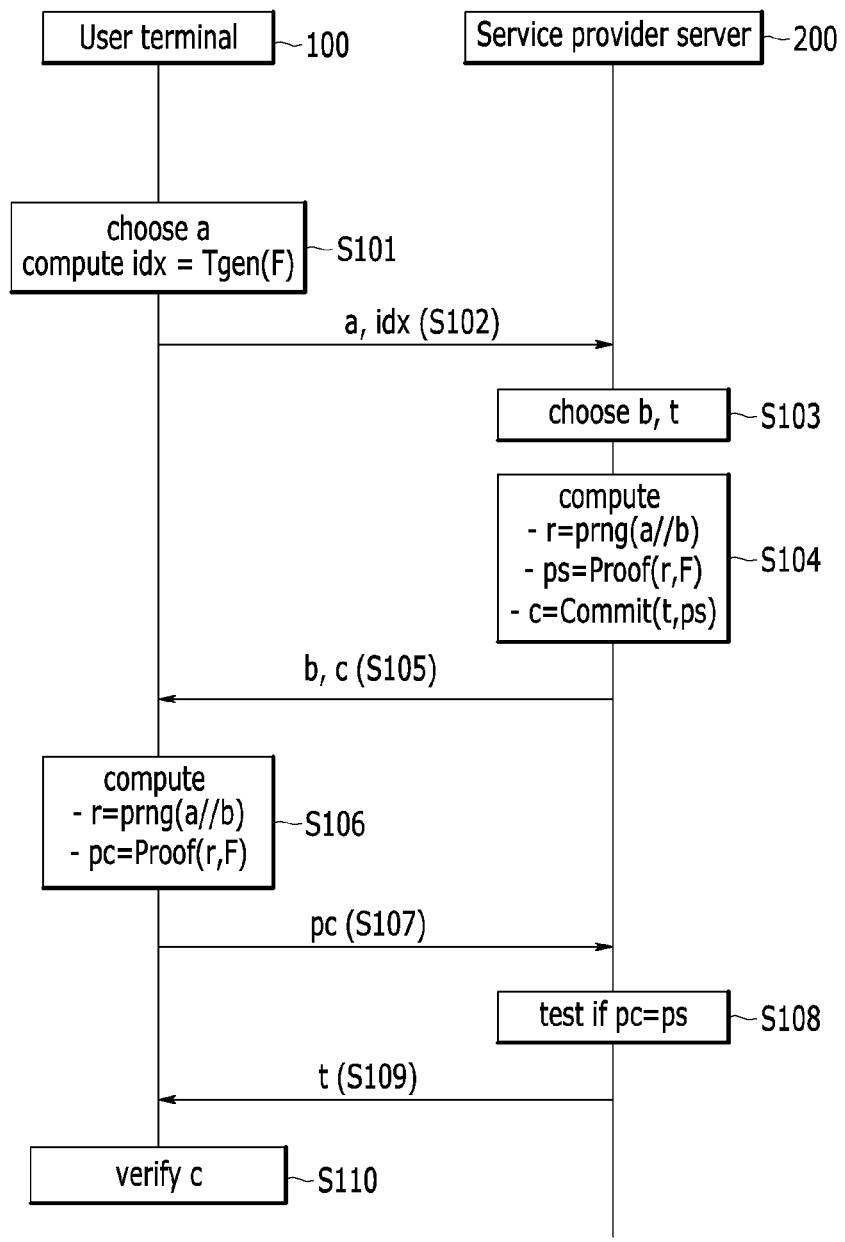
FIG. 1 shows a method for verifying data ownership between a user terminal and a service provider server according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. The terms used herein are defined according to the functions of the present invention and may vary depending on a user's or an operator's intension and usage. Therefore, the terms used herein should be understood based on the descriptions made herein. A skill proposed in an exemplary embodiment of the present invention represents a method for design of a general protocol for designing a scheme of the present invention based on known skills.

Throughout the specification, a user terminal may indicate a mobile terminal (MT), a mobile station (MS), an advanced mobile station (AMS), a high-reliability mobile station (HR-MS), a subscriber station (SS), a portable subscriber station (PSS), an access terminal (AT), or user equipment (UE), or it may include entire or partial functions of the MT, MS, AMS, HR-MS, SS, PSS, AT, and UE.

In the following detailed description, only certain exemplary embodiments of the present invention have been shown and described, simply by way of illustration.

FIG. 1 shows a method for verifying data ownership between a user terminal 100 and a service provider server 200 according to an exemplary embodiment of the present invention.

Referring to FIG. 1, the user terminal 100 arbitrarily selects a random number (a) and calculates an index value (idx) for searching a file (F) to be uploaded (S101).

The user terminal 100 may calculate the index value (idx) by using a tag generating function (Tgen) for generating an index as in [Equation 1].

$$idx = Tgen(F) \qquad \text{[Equation 1]}$$

The user terminal 100 transmits the random number (a) and the index value (idx) to the service provider server 200 (S102). The service provider server 200 searches whether a storage space has a same file as a corresponding file (F) based on the index value (idx).

When the storage space has no same file according to a search result, the service provider server 200 requests the user terminal 100 to upload the corresponding file (F).

When the storage space has no same file (F), the user terminal 100 and the service provider server 200 mutually verify the ownership on the corresponding file (F). The service provider server 200 verifies whether the user terminal 100 actually owns the corresponding file (F), and the user terminal 100 verifies whether the storage space of the service provider server 200 actually has the corresponding file (F).

In detail, the service provider server 200 arbitrarily selects two random numbers (b, t) (S103). The service provider server 200 uses the random numbers (a, b, t) and file information of the file (F) to generate a server response value (ps) and a commitment value (c) of the server response value (ps) (S104). The file information is known by the user who owns the file (F).

In detail, the service provider server 200 calculates a random number (r), that is, a challenge value, by using the random number (a) and the random number (b). The random number (r) may be calculated by using a function that is not able to expect an output when the entire inputs are unknown. For example, a random number generating function (prng) may be used as expressed in [Equation 2].

$$r = prng(a \| b) \qquad \text{[Equation 2]}$$

The service provider server 200 calculates the server response value (ps) that is a response by use of file information on the file (F) for the random number (r). As expressed in [Equation 3], the service provider server 200 may calculate the server response value (ps) by using a function (Proof) for calculating a response to the challenge used in a one-direction ownership proving scheme operable by a challenge-response method.

$$ps = Proof(r, F) \qquad \text{[Equation 3]}$$

An exemplary embodiment of the present invention is not restricted to this, and the server response value (ps) may be calculated by using another function for generating a value operable by the service provider server 200 owning the file (F) when the random number (r) is provided.

The service provider server 200 calculates the commitment value (c) corresponding to the server response value (ps) by using a random number (t). The commitment value (c) is generated with the random number (t) and the server response value (ps) to be released as hidden inputs. To achieve this, the service provider server 200 may calculate the commitment value (c) by using the commitment scheme as expressed in [Equation 4].

$$c=\text{Commit}(t,ps) \quad \text{[Equation 4]}$$

An exemplary embodiment of the present invention is not limited thereto, and the commitment value (c) may be calculated by using another function for proving that the commitment value (c) is generated by the server response value (ps) when the random number (t) is released to the user terminal 100.

The service provider server 200 transmits the random number (b) and the commitment value (c) to the user terminal 100 (S105). The user terminal 100 generates a user response value (pc) by using the random numbers (a, b) and file information of the file (F) (S106).

To achieve this, the user terminal 100 calculates the random number (r), that is, a challenge value, by using the random number (a) and the random number (b) as expressed in [Equation 2]. The user terminal 100 calculates the user response value (pc) by using file information of the file (F) the user owns, regarding the random number (r), as expressed in [Equation 3].

That is, the user terminal 100 and the service provider server 200 use the random numbers (a, b) exchanged by themselves to calculate the same challenge value (r), and use file information of the file (F) they own to calculate the user response value (pc) and the server response value (ps) for the challenge value (r).

In this state, the user terminal 100 transmits the calculated user response value (pc) to the service provider server 200 (S107). The service provider server 200 checks whether the user response value (pc) corresponds to the server response value (ps) (S108).

When the user response value (pc) does not correspond to the server response value (ps) according to a checking result, the service provider server 200 determines that the user terminal 100 does not actually own the corresponding file and prohibits the user terminal 100 from accessing the file (F).

When the user response value (pc) corresponds to the server response value (ps), the service provider server 200 determines that the user terminal 100 actually owns the corresponding file and imparts the user terminal 100 a right to access the file (F). The service provider server 200 releases the random number (t) to the user terminal 100 (S109).

The user terminal 100 uses the random number (t) and the user response value (pc) to verify the commitment value (c) provided by the service provider server 200 (S110). For example, the user terminal 100 may calculate the commitment value (c) according to [Equation 4], or may use a verification equation to verify whether the commitment value (c) provided by the service provider server 200 is a value calculated by using the random number (a) released by the user terminal 100.

Therefore, the case when the user does not know that the service provider server 200 does not actually have the file (F) or the case when he does not know the problem deletes the file (F) stored in the user terminal 100 may be prevented.

An exemplary embodiment of the present invention is not limited to this, and the user terminal 100 and the service provider server 200 may exchange their roles to mutually verify the ownership.

Figure 2:
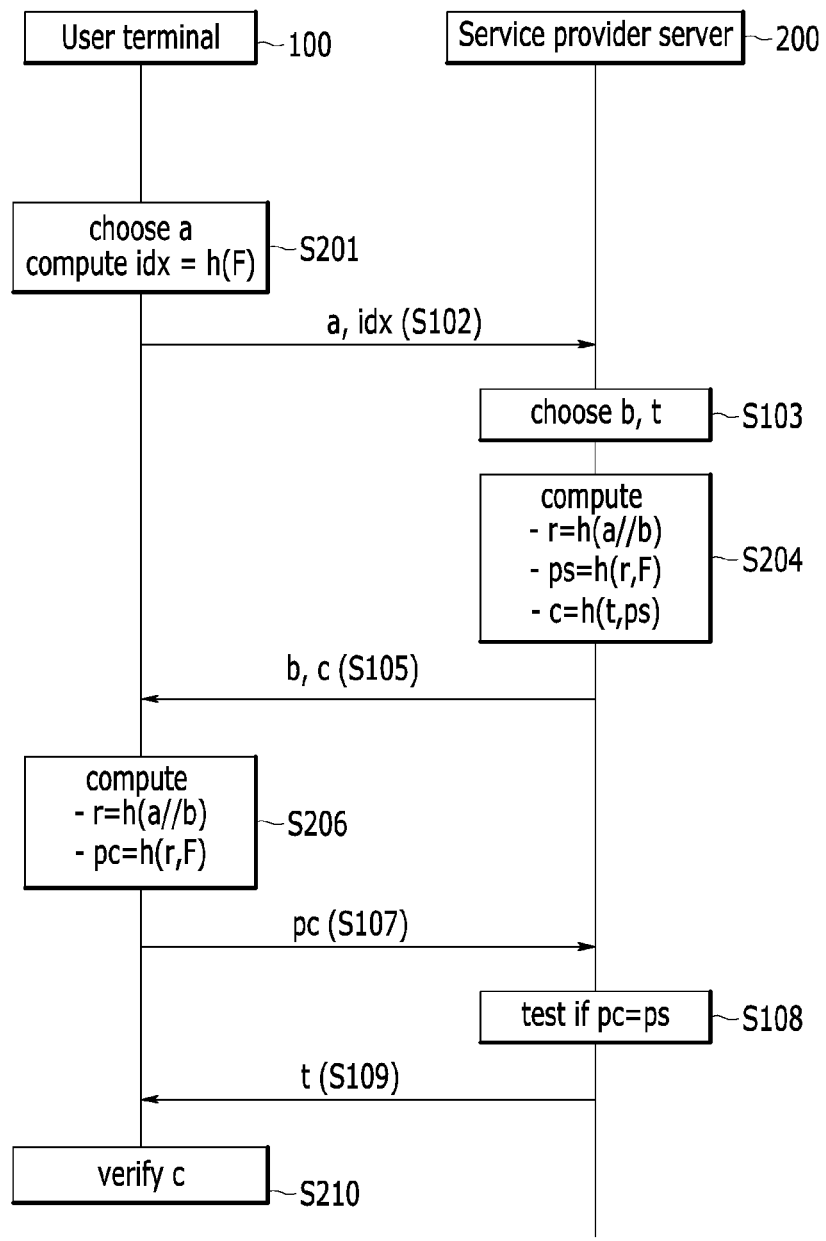
FIG. 2 shows a method for verifying data ownership between a user terminal and a service provider server according to another exemplary embodiment of the present invention.

FIG. 2 shows a method for verifying data ownership between a user terminal 100 and a service provider server 200 according to another exemplary embodiment of the present invention.

Referring to FIG. 2, a method for verifying data ownership according to another exemplary embodiment of the present invention realizes the elemental algorithm based on the hash function, which is different from FIG. 1. FIG. 2 will provide different reference numerals to states that differ from FIG. 1 and will be described.

That is, the user terminal 100 may calculate the index value (idx) as expressed in [Equation 5] (S201).

$$idx=h(F) \quad \text{[Equation 5]}$$

The service provider server 200 may calculate the random number (r) as expressed in [Equation 6] (S204).

$$r=h(a\|b) \quad \text{[Equation 6]}$$

The service provider server 200 may calculate the server response value (ps) as expressed in [Equation 7].

$$ps=h(r,F) \quad \text{[Equation 7]}$$

The service provider server 200 may calculate the commitment value (c) as expressed in [Equation 8].

$$c=h(t,ps) \quad \text{[Equation 8]}$$

In a like manner, the user terminal 100 may calculate the random number (r) and the user response value (pc) as expressed in [Equation 6] and [Equation 7] (S206).

Figure 3:
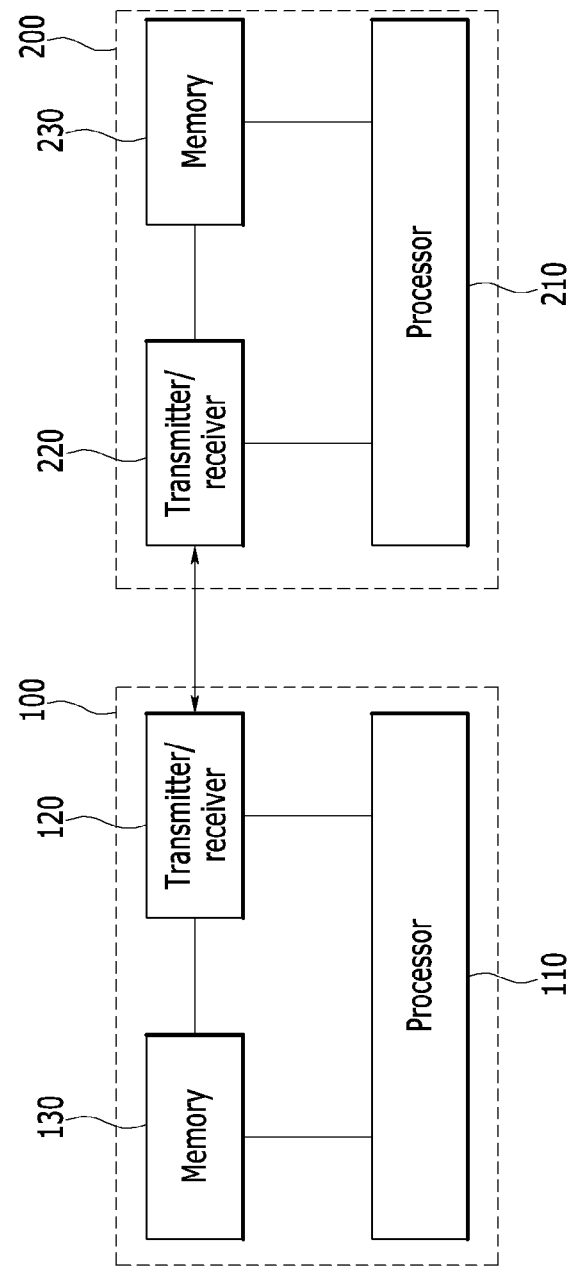
FIG. 3 shows a device for verifying data ownership of a user terminal and a service provider server according to an exemplary embodiment of the present invention.

FIG. 3 shows a device for verifying data ownership of a user terminal 100 and a service provider server 200 according to an exemplary embodiment of the present invention.

Referring to FIG. 3, the device for verifying a data ownership of the user terminal 100 includes a processor 110, a transmitter/receiver 120, and a memory 130. The processor 110 selects an arbitrary random number (a) when a request for uploading the file (F) stored in the memory 130 to the service provider server 200 is generated, and it then calculates the index value (idx) of the file (F). The processor 110 transmits the upload request including the calculated random number (a) and the index value (idx) to the service provider server 200 through the transmitter/receiver 120.

The processor 110 receives the random number (b) and the commitment value (c) from the service provider server 200 to store the commitment value (c) in the memory 130, and uses the random number (a) and the random number (b) to calculate the random number (r).

The processor 110 calculates the user response value (pc) by using the random number (r) and file information of the file (F). The processor 110 transmits the calculated user response value (pc) to the service provider server 200 through the transmitter/receiver 120.

The processor 110 receives the random number (t) from the service provider server 200, and uses the random number (t) and the user response value (pc) to verify the commitment value (c).

The device for verifying a data ownership of the service provider server 200 includes a processor 210, a transmitter/receiver 220, and a memory 230. The processor 210 receives the random number (a) and the index value (idx) from the user terminal 100, accepts the upload request of the user terminal 100 depending on whether the memory 230 has the file (F) that corresponds to the index value (idx), or verifies whether the user terminal 100 owns the file (F).

In detail, the processor 210 accepts the upload request of the user terminal 100 when the memory 230 does not have the corresponding file (F). The processor 210 arbitrarily selects the random number (b, t) when the memory 230 has the file (F). The processor 210 uses the random number (a) and the random number (b) to calculate the random number (r), and uses the random number (r) and file information of the file (F) to calculate the server response value (ps).

The processor 210 uses the random number (t) to calculate the commitment value (c) corresponding to the server response value (ps), and transmits the random number (b) and the commitment value (c) to the user terminal 100 through the transmitter/receiver 220. The processor 210 receives the user response value (pc) from the user terminal 100, and verifies whether the user terminal 100 owns the file (F) depending on whether the user response value (pc) corresponds to the server response value (ps).

The processor 210 imparts an access right to the file (F) to the user terminal 100 when the user response value (pc) corresponds to the server response value (ps), and the processor 210 transmits the random number (t) selected by the processor 210 to the user terminal 100 through the transmitter/receiver 220. The processor 210 prohibits access of the user terminal 100 to the file (F) when the user response value (pc) does not correspond to the server response value (ps).

As described above, the method for verifying data ownership according to an exemplary embodiment of the present invention may not only verify the ownership of the user through the client-side deduplication skill, but also through the ownership of the server.

For this purpose, the challenge value (r) is generated in common, and same ownership verifying information, that is, a server response value (ps) and a user response value (pc), is generated based upon it. A problem for the user terminal 100 and the service provider server 200 to simultaneously release the response value is solved by applying a commitment scheme.

Therefore, an exemplary embodiment of the present invention does not need to allow the user terminal 100 and the service provider server 200 to generate different pieces of ownership verifying information and verify the same when a process for mutually verifying the ownership is performed. The user terminal 100 and the service provider server 200 may perform a reliable mutual verifying process with the merit of reducing the cost of generating proof information for mutually verifying ownership.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of verifying ownership of data on a server, performed by a terminal, the method comprising:
   selecting a first random number;
   calculating an index value of a file;
   transmitting the first random number, the index value, and a request to upload the file to the server;
   calculating, by the terminal, a challenge value by using the selected first random number and a second random number provided by the server;
   calculating, by the terminal, a user response value based on the challenge value and information of the file;
   transmitting the user response value to the server; and
   verifying ownership of the file, which is stored on the server, using a commitment value provided by the server.

2. A method of verifying ownership of data on a server, performed by a terminal, the method comprising:
   selecting a first random number;
   calculating an index value of a file;
   transmitting the first random number, the index value, and a request to upload the file to the server;
   calculating, by the terminal, a challenge value by using the first random number and a second random number provided by the server;
   calculating, by the terminal, a user response value based on the challenge value and information of the file;
   transmitting the user response value to the server; and
   verifying ownership of the file, which is stored on the server, using a commitment value provided by the server, wherein
   the commitment value corresponds to a server response value generated in response to the challenge value by using information of the file, which corresponds to the index value.

3. The method of claim 2, wherein
   the commitment value is calculated by using a third random number released by the server in response to the user response value corresponding to the server response value.

4. The method of claim 1, wherein the calculating of the challenge value comprises receiving the second random number, which is selected by the server in response to the server having the file which corresponds to the index value.

5. A method of verifying ownership of data, performed by a server, the method comprising:
   receiving a first random number and an index value of a file from a terminal;
   selecting a second random number, in response to the file which corresponds to the index value existing;
   calculating, by the server, a challenge value by using the received first random number from the terminal and the second random number;
   calculating, by the server, a server response value based on the challenge value by using information of the file;
   receiving a user response value based on the challenge value from the terminal; and
   verifying ownership of the file according to the server response value and the user response value.

6. A method of verifying ownership of data, performed by a server, the method comprising:
   receiving a first random number and an index value of a file from a terminal;
   selecting a second random number, in response to the file which corresponds to the index value existing;
   calculating, by the server, a challenge value by using the received first random number from the terminal and the second random number;
   calculating a server response value based on the challenge value by using information of the file; and receiving a user response value based on the challenge value from the terminal; and verifying ownership of the file according to the server response value and the user response value, wherein the verifying of the ownership on the file comprises:

calculating a commitment value corresponding to the server response value by using a third random number, determining whether the server response value corresponds to the user response value, and enabling the terminal to access the file, in response to the server response value corresponding to the user response value.

7. The method of claim 6, further comprising:

releasing the second random number and the commitment value to the terminal; and releasing the third random number to the terminal, in response to the server response value corresponding to the user response value, wherein the verifying of the ownership comprises verifying, by the terminal, the ownership of the file, which is stored on the server, using the third random number and the commitment value.

8. The method of claim 5, further comprising:

releasing the second random number to the terminal; and calculating the user response value using information of the file and the challenge value.

9. The method of claim 1, wherein the index value is calculated using a tag generating function, and is used to search for the file.

10. The method of claim 1, wherein the verifying of the ownership comprises mutually verifying the ownership of the file, by the server determining whether the terminal owns the file and the terminal determining whether the server has the file.

11. The method of claim 1, wherein the terminal and the server calculate the challenge value based on the first random number and the second random number, which are exchanged, and calculate the user response value and a server response value for the challenge value, based on the information of the file.

12. The method of claim 2, wherein in response to the user response value not corresponding to the server response value, the server determines that the terminal does not own the file and prohibits the terminal from accessing the file, and in response to the user response value corresponding to the server response value, the server determines that the terminal owns the file and imparts the terminal with a right to access the file.

13. The method of claim 3, further comprising:

verifying the commitment value using the third random number and the user response value.

14. The method of claim 1, wherein the commitment value corresponds to a server response value generated in response to the challenge value by using information of the file, which corresponds to the index value.

15. The method of claim 14, wherein the commitment value is calculated by using a third random number released by the server in response to the user response value corresponding to the server response value.

16. The method of claim 15, further comprising:

verifying the commitment value using the third random number and the user response value.

17. The method of claim 14, wherein in response to the user response value not corresponding to the server response value, the server determines that the terminal does not own the file and prohibits the terminal from accessing the file, and in response to the user response value corresponding to the server response value, the server determines that the terminal owns the file and imparts the terminal with a right to access the file.

18. The method of claim 5, wherein the verifying of the ownership on the file comprises calculating a commitment value corresponding to the server response value by using a third random number, determining whether the server response value corresponds to the user response value, and enabling the terminal to access the file, in response to the server response value corresponding to the user response value.

19. The method of claim 18, further comprising:

releasing the second random number and the commitment value to the terminal; and releasing the third random number to the terminal, in response to the server response value corresponding to the user response value, wherein the verifying of the ownership comprises verifying, by the terminal, the ownership of the file, which is stored on the server, using the third random number and the commitment value.

* * * * *